United States Patent [19]

Cleaver et al.

[11] 4,171,853

[45] Oct. 23, 1979

[54] VACUUM OPERATED SEWERAGE SYSTEM

[75] Inventors: Donald D. Cleaver; Richard B. Notz, both of Rochester, Ind.; Arnold G. Trobaugh, Milwaukee, Wis.

[73] Assignee: Burton Mechanical Contractors, Rochester, Ind.

[21] Appl. No.: 816,037

[22] Filed: Jul. 15, 1977

[51] Int. Cl.² .................... B65G 53/34; F16K 31/36
[52] U.S. Cl. ................................ 406/48; 251/61.5; 406/192
[58] Field of Search ............ 92/78, 79; 251/61.2, 251/61.3, 61.4, 61.5; 137/314; 55/97, 525, DIG. 25; 62/272, 285; 302/14, 15, 17, 27, 64, 66, 1, 36

[56] References Cited

U.S. PATENT DOCUMENTS

| 3,294,453 | 12/1966 | Desmarchais et al. | 302/14 X |
|---|---|---|---|
| 3,705,480 | 12/1972 | Wireman | 55/316 X |
| 3,724,177 | 4/1973 | Grote | 55/316 |
| 3,777,778 | 12/1973 | Janu | 137/487.5 |
| 4,015,959 | 4/1977 | Grote | 55/525 X |

Primary Examiner—James L. Rowland
Attorney, Agent, or Firm—Andrus, Sceales, Starke & Sawall

[57] ABSTRACT

A vacuum-operated sewer system includes an integrated main valve and controller upstream of a collection unit for admitting sewage into the system. An in-line valve unit has a piston-cylinder operator. A vacuum-operated controller and a pilot valve unit are mounted on the operator. A pressure sensor is connected to the gravity side of the valve. A surge tank and check valve connect the vacuum side to a supply port of the controller. A water trap tank is located between the bottom end of an intake air line and the connection to the valve operator and controller assembly. A mesh fills the tank to increase the heat transfer of the moisture laden air such that the moisture condenses out in the tank. A drain system is connected to the trap tank and the operator to discharge accumulated water from the control system into the sewer system during each cycle of the valve unit.

24 Claims, 5 Drawing Figures

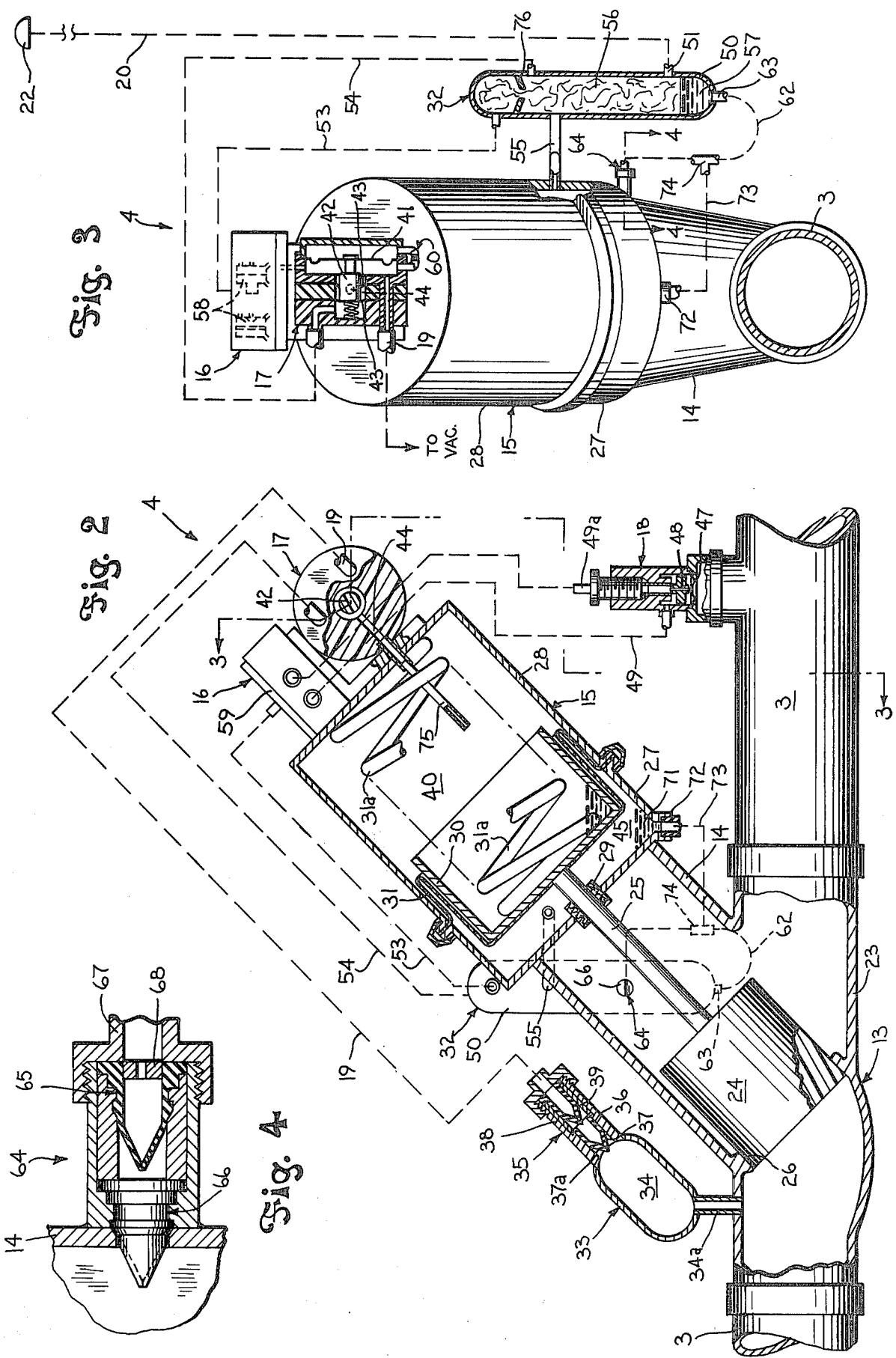

VACUUM OPERATED SEWERAGE SYSTEM

BACKGROUND OF THE INVENTION

This invention relates to a vacuum operated sewerage control system and particularly to such a system employing control apparatus adapted to be mounted below ground level.

A functional vacuum operated sewerage collection system employs a vacuum collection station connected to the terminal end of a pipe network of sewer lines which may extend outwardly a distance of several miles. Each sewerage inlet point, typically serving one or two houses, includes a valve and controller assembly providing intermittent feed of sewage into the vacuum pipe network in the form of a slug of sewage followed by atmospheric air. The sewage slug moves at a high speed through the pipe due to pressure differential of vacuum pressure in front and atmospheric pressure behind it, as far as the slug fills full cross-section of the pipe and therefore, creates a seal in the pipe. The slug movement eventually stops as the pressure differential diminishes after the inlet valve has been closed and also due to the fact that the sewage slugs falls apart by friction and doesn't fill the full cross-section of the pipe. The slugs are collected and reformed in pockets created in the sewerage pipe and during the next operating cycle of the inlet valve and controller combination a new slug of sewage with atmospheric air behind it enters the system and the pressure differential is again created and thus, all slugs in the reforming pockets of the sewage line move certain distance forward. This cycle of forming and transport for a distance, disintegration, reforming, etc. is repeated every time an inlet valve and controller combination goes through its cycle and lets a slug of sewage and atmospheric air into the vacuum supplied sewage pipe network.

A particularly satisfactory controller assembly is disclosed in U.S. Pat. No. 3,791,397 which issued Dec. 11, 1973 to George J. Janu, wherein the vacuum in the sewerage line is employed as the source of operation energy for the valve and controller assembly. A hydrostatic pressure sensor is mounted immediately upstream of the discharge control valve. The operating pressure supply is connected to the flow line downstream of the main discharge valve through a regulator providing reference vacuum independent of the flow line vacuum, at least to a minimum vacuum condition. A fluid timing network connects the sensor to one side of a comparator, the opposite side of which is connected to the output of the regulator. A time delay is thus introduced to prevent response to temporary pressure changes such as shock conditions. The comparator drives a fluid timing capacitor which interconnects the output of the comparator through a suitable fluid switch to a pilot valve for controlling the main discharge valve. The sensor actuates a timing means to establish discharge flow for a predetermined time after which the system resets to standby to subsequently respond when the light level again establishes a signal indicating a high limit. The timing means provides a constant volume of the liquid discharged per cycle into the system. The pilot valve is constructed to produce a break-before-make switching operation to establish a reliable transfer of an operating pressure signal to the main discharge valve for actuating thereof for discharge.

The main valve unit is a piston operated plug valve positioning an elastomer seal member relative to a valve seat and positively closed by the spring force and the system vacuum. The piston operator is mounted on a coupling elbow of the plug valve and includes a piston rod slidably mounted in a liquid tight seal. The piston rod is connected to a cup-shaped piston and rolling diaphragm mounted within an operator cylinder, with atmospheric air and vacuum selectively impressed on the cylinder for opening and closing the valve. The controller is conveniently mounted on top of the operator and connected to the sensor and to the vacuum line for operating power to provide a compact and integrated inlet valve and controller assembly.

The inlet valve controller assembly is typically located in a covered pit several feet below ground level for direct in-line connection in the sewer pipe. The air intake pipe or pipes are brought out of the pit and located to prevent entrance of rain and/or ground water.

The several operating and control components are however often subjected to operation in submerged water conditions. As a result of heavy rain, locations having relatively high water tables and the like, the control pit may contain water levels submerging the valve and controller assembly. Although the system component can be constructed reasonably liquid tight, there is always the probability of some leakage within a practically constructed enclosure, at the tubing connections and the like. The use of vacuum pressure within the several chambers of the control assembly, of course, tends to promote leakage and makes the problem even greater.

The entry of water into the control assembly generally interferes with the optimum functioning of the system particularly over relatively long periods of time. The presence of water, for example, interferes with the free movement of the moveable components, either slowing them down or in extreme cases preventing movement. This, of course, results in a malfunctioning. Water, of course, may also cause relatively significant corrosion of the valve and controller components, resulting in malfunction of the assembly.

A significant problem associated with the presence of water within the system arises as a result of surface tension of water slugs within the lines and components, functioning to restrict or prevent proper airflow through the system. For example, an air filter is normally provided in the air intake line. This fine filtering media normally is constructed with openings on the order of 0.7 microns. If water wets the fine filtering media, the surface tension may be such as to block the filtering openings, preventing proper supply of air.

The surface tension characteristic of water within the system may similarly block free air flow through the small internal diameter tubing, air flow restricting orifices and the like. The required air flow is again prevented with a resulting improper functioning of the controller system.

In addition, the assembly is subjected to various other possible sources of water.

Water may be introduced into the various operating components as a result of the continous flow of atmospheric air supplied through the sensor and the controller during standby. When the sensor triggers a flow cycle, a substantially higher intermittent atmospheric air flow is supplied to the piston operator to effect the opening and closing of the main valve. During those periods of the year when the ambient or atmospheric air is relatively warm, the air is at a high relative humidity, with a consequent high moisture content. The subterranean valve and controller assembly is relatively cool. The atmospheric air is drawn into the several chambers and as a result of a heat transfer between the air and the cold structure elements, the air temperature approaches the temperature of the elements. The cooling of the hot, moist air rapidly drops its temperature, normally below its dew point. As a result, rapid saturation of the intake air with moisture is created, with the excess moisture condensing onto the elements of the valve and controller assembly. The particular amount of condensation, of course, depends upon each particular installation, particularly ventilation, depth, geographical location, prevailing weather conditions and the like. However, in many installations, the quantity may be of such a level, particularly if there is any other leakage, that a malfunction or less than desireable function of the assembly is obtained.

Further, the flow through the main sewer line and the main valve unit provides a further possible source of introduction of water and foreign matter into the control assembly. For example, the vacuum operated assembly is connected to the vaccum supply side of the main valve. The flow conditions in a sewer pipe are generally of a relatively high velocity and turbulent characteristic at the time of main valve opening. There is a significant probability that water and sewage from the main sewer line may enter the vacuum supply connection or port and enter into the valve controller assembly. Further, upon opening of the main valve, a rapid decrease in the level of vacuum on the vacuum side of the valve results. A momentary condition may occur with the vacuum inside the controller higher than at the connection point to the sewer line. Such resulting pressure differential tends to introduce water and sewage into the controller assembly.

In some installations, the downstream water sewer line may slope downwardly toward the valve and controller assembly. When the main valve is closed, the hydrostatic pressure associated with the accumulation of water and sewage may force sewage into the vacuum supply connection. The sliding seal of a piston rod operator, of course, forms a further possible leakage location. Mistakes during installation and even after installation, such as an accidental momentary location of the end of the air tube in water, or erroneous installation in a ground plane water location, will introduce water into the assembly.

Thus, the inventors have discovered that the presence of water within the internal components generates problems and is a distinct source of malfunction of the vacuum operated system. Such water may arise as a result of the buried location of the valve and controller assembly, moisture in the intake air condensing within the operating and control components, the operating pressure conditions and finally leakage conditions within the assembly due to normal manufacturing tolerances, erroneous workmanship or the like.

SUMMARY OF THE PRESENT INVENTION

The present invention is particularly directed to a vacuum operated sewage collection system including moisture isolating and separating means to significantly and positively minimize the introduction of moisture and water into the valve and controller assembly. Generally, in accordance with the present invention, the system includes suitable check valve and collection means to isolate the several systems components from the sources of moisture in combination with means for the removing of any accumulated water from the assembly. Generally, in accordance with the present invention, a surge tank and check valve unit is interconnected between the vacuum supply port connection of the main vacuum sewage line and the valve and controller assembly. A water trap accumulator unit is located between the air intake line and the air inlet to the valve controller assembly. Means are also provided for automatically draining the chambers of the main valve operator and water trap as a result of the various pressure conditions created during an opening and closing cycle.

More particularly in a preferred construction, an integrated main valve and controller assembly includes an in-line valve unit with a piston-cylinder operator mounted thereon. A vacuum-operated controller and a pilot valve unit are mounted on the operator, with a sensor mounted in the in-line valve pipe to the gravity or atmospheric pressure side. A surge tank is connected to the vacuum side of the in-line pipe and a check valve is connected to the surge tank and to the vacuum input of the controller. The surge tank provides for accumulation of foreign matter for eliminating of the danger of sewage entering the vacuum input during turbulent flow condition in the main sewage pipe, and for minimizing rapid pressure changes at the input of the controller. The check valve unit may be a pair of series connected rubber duckbill design which produces a highly effective sealing under the conditions encountered, particularly where the sewer line slopes downwardly toward the main valve.

A water trap or accumulator is located in the intake air system and is preferably constructed as a stagnation chamber in which the air flow path is increased before the operating air enters into the controller assembly. The trap is, in a practical construction, an elongated tank with a bottom input and a separate top outlets. A large contact surface material is preferably provided within the accumulator to provide increased heat transfer of the moisture laden air such that the moist air is cooled below its dew point and the moisture condensed within the accumulator and thus before the air enters into the controller assembly. Suitable valve means respond to the pressure conditions to discharge the accumulated water into the sewage system. A partition or a baffle is also preferably located within the tank and the heat transfer medium in spaced relation to the controller port. The baffle prevents a water mist within the chamber, created as the result of discharge of relatively large volumes of air from the piston operator during the closing stroke, from entering the controller port. This is important, as any water mist created could be forced backwardly into the air intake filter, resulting in a wetting of the filter and effectively closing thereof as a result of water surface tension.

A dip tube is located in the closing chamber of the cup shaped operator and is coupled to the system to automatically syphon and remove any accumulated water during each discharge cycle. Similarly, the opposite side of the piston operator is provided with a suitable check valve porting arrangement to automatically remove and discharge accumulated moisture into the sewage system during each operating cycle.

The vacuum operated sewage transport system of the present invention thus incorporates means for effectively isolating of the operating components from the water content of the air and/or sewage line, arranges the several valve and controller assembly components to minimize introduction of water moisture into the operating components and locates any accumulated moisture for convenient and automatic removal into the sewage system. This improved system has been found to significantly increase the life and reliability of the vacuum operated valve and controller assembly without significantly increasing the cost.

BRIEF DESCRIPTION OF DRAWINGS

FIG. 2 is an enlarged side elevational view of the valve and controller assembly shown in FIG. 1 with parts broken away and sectioned to illustrate the construction of the main components employed in the improved system of the present invention;

FIG. 3 is a side elevational view of a valve and controller assembly shown in FIG. 2;

FIG. 4 is an enlarged fragmentary sectional view illustrating a check valve unit shown diagrammatically in FIG. 2.

DESCRIPTION OF ILLUSTRATED EMBODIMENTS

Figures 1, 5:
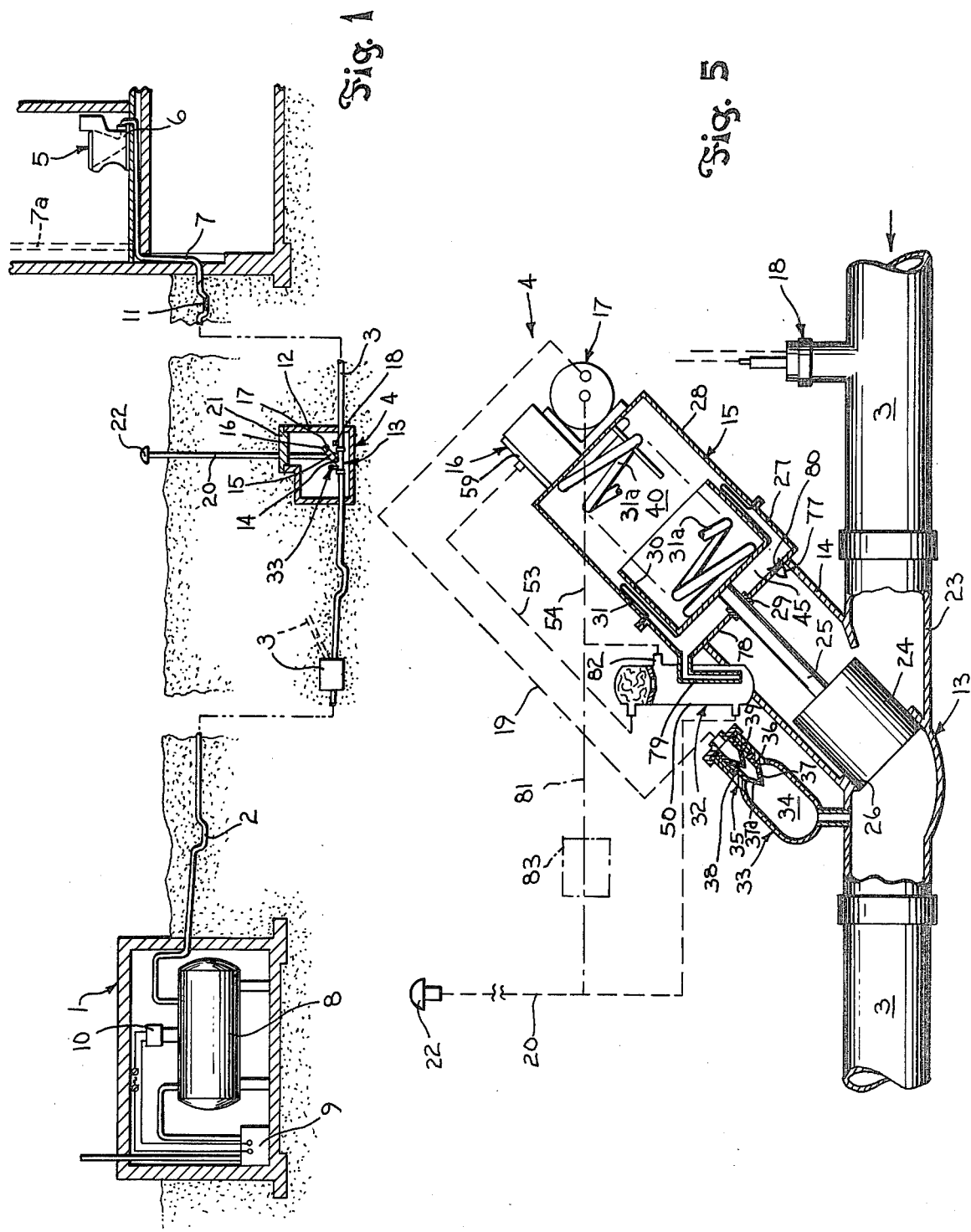
FIG. 1 is a diagrammatic view of a vacuum operated sewer system employing a valve and controller assembly mounted within a subterranean pit.
FIG. 5 is a view similar to view 2 illustrating an alternate construction of the air intake valve assembly particularly the water trap assembly and the air intake systems.

Referring to the drawing and particularly to FIG. 1 the present invention is shown applied to a vacuum operated sewage system wherein a main sewer collection station is connected by a main line 2 to a plurality of branch lines 3, each of which is connected to service a plurality of sewage sources, typically one or two houses. The branch line 3 includes an inline valve unit 4 which is selectively opened when a selected amount of sewage has accumulated upstream of the valve.

In FIG. 1 a typical water closet bowl 5 is shown in which water from a controllable supply and any excrements and/or other waste materials accumulate. A bowl outlet 6 is connected to the terminal end of the branch line 3 by a suitable piping 7 in accordance with conventional practice. The accumulated waste material is discharged into the sewer line 3 as a result of conventional gravity forces and accumulates therein upstream of the inline valve 4, which opens in response to creation of a sufficient hydrostatic pressure level in the upstream portion of line 3. The pipe 7 is an effective vertical standpipe which produces a hydrostatic pressure. This pressure appears immediately in the upstream end of the valve unit 4 and is coupled to actuate and open the valve unit 4. A conventional vertical standpipe 7a in the house, or next to it, supplies atmospheric air to the line 3. This avoids emptying of the drain-traps in the toilets and other plumbing fixtures. The collection station 1 includes a main holding or collection tank 8 connected to line 2. The tank 8 is held at a sub-atmospheric pressure hereinafter referred to as a vacuum by a suitable electrically operated evacuation pump 9, which is controlled by pressure sensitive relay 10 on tank 8. The relay 10 for example is set to start pump when the tank pressure drops to 0.6 atmospheric pressure and stop at 0.4 atmospheric pressure, such as disclosed in the above identified U.S. Patent. The main line 2 is thus at a vacuum and lines 3 downstream of the valve unit 4 are at a vacuum. When valve unit 4 opens, the vacuum appears on the downstream side of the sewage 11 accumulated in line 3 and atmospheric pressure appears on the upstream side thereof. As a result, the accumulated water and sewage 11 rapidly passes down the line 3 and through valve unit 4. The valve unit 4 is connected in-line with line 3 and is located within a suitable covered pit 12 in the area of the houses serviced by the unit 4.

In the illustrated embodiment of the invention the valve unit 4 is preferably constructed in accordance with the teaching of U.S. Pat. No. 3,777,778 as a vacuum-operated self-contained assembly to be connected directly into the main sewer line. Generally, the unit 4 includes a main valve 13 connected in series in the sewer pipe line 3. The valve 13 is normally closed and separates the vacuum side from the gravity side of the flow system. An angularly extended pipe section 14 supports a fluid piston operator 15 for opening and closing the valve 13. A valve controller 16 and a pilot spool valve 17 are mounted on the outer wall of piston operator 15. The hydrostatic pressure sensor 18 is connected to the gravity or upstream side of the main valve 13 and provides a signal when sewage has accumulated to a sufficient level to warrant opening of the valve 13 and feeding of a slug of sewage 11 through the sewer lines 3 and 2. The valve controller 16 is a vacuum operated unit as is the spool valve 17. A vacuum pressure signal line 19 is connected immediately downstream from the valve 13 to provide operating pressure. Atmospheric air is supplied to the sensor and to the operator 15 via an air intake line 20 which extends upwardly through the pit entrance 21 and terminates at the upper end in a rain cap and breather 22 to prevent entrance of ground and rain water. The pneumatic sensor 18 is preferably constructed and connected as shown in U.S. Pat. No. 3,777,778 and more fully described in U.S. Pat. No. 3,791,397, and is connected to the controlleer 16 which is a vacuum operated fluid timing device as shown in that patent. The spool valve 17 is preferably constructed shown in issued U.S. Pat. No. 3,774,637. The main valve 13 is a known plug valve including a pipe 23 for connection in line 3 with the operator pipe extension 14 projecting upwardly and axially to the gravity side of the valve. A cylindrical plug 24 provided with an elastomer seal on its bottom edge is mounted on the outer end of a piston rod 25 for opening and closing movement with respect to a valve seat 26. The piston-operator 15 includes a two piece cylinder having a lower cup-shaped member 27 fixed to and closing the outer end of the pipe extension 14 and an outer cup-shaped member 28 secured to the outer end of member 27. The piston rod 25 is slidably mounted in a sliding liquid seal 29 in member 27 and is secured to the base of a cup-shaped piston 30 having a diameter slightly less than the cylinder and loaded by spring 31a. A diaphragm 31 is clamped between the cylinder member 27 and 28 and looped upwardly with the inner end secured to the base of the cup-shaped piston 30 and dividing the cylinder chamber into two separate chambers. The controller 16 and spool valve 17 are suitably mounted on the upper end of the outer cylinder member 28. The present invention is particularly directed to improvements in the vacuum operated system which minimize the introduction and entry of water and moisture into the several operating and control units described. As such individual elements and their functions are fully described in the cross-referenced patents, the description herein is generally limited to the particular aspects significant to the unique features and structures provided by the present invention.

Generally, in accordance with the present invention, the atmospheric air supply includes a water trap and drain unit 32 connecting the air intake line 20 to the several operating components, a pressure and material separating or isolating unit 33 connecting the vacuum line 19 to the sewer line 3 and various drain means, as hereinafter described to remove moisture from operator 15 as well as the unit 32.

As more clearly illustrated in FIGS. 2 and 3, the pressure and material separator and isolating unit 33 includes a surge tank 34 having a bottom port connection 34a connected to the valve pipe 23 immediately downstream of the main valve seat 26. The tank 34 is a small conventional tank having curved opposite ends and is mounted angularly oriented generally along the line of the operator elbow or extension 14. The upper end of the tank 34 is connected by the small vacuum line 19 to the spool valve 17 and (internal connection) to the controller 16. A check valve unit 35 is located between tank 34 and line 19. The unit 35 opens as long as the controller pressure is relatively greater than the surge tank pressure and permits the transmission of the vacuum pressures signal from the surge tank 34 of the connecting vacuum signal line 19. The valve unit 35 closes whenever the pressure in line 19 is less than the pressure in the tank 34 and the interconnected sewer pipe 23.

The surge tank 34 allows accumulation of water and sewage during the high velocity and turbulent flow conditions, with the accumulation being withdrawn at the end of the flow cycle as a result of the vacuum conditions maintained in the downstream side of the line 3. At initial opening of valve 13 and pipe 23, particularly where the line is rapidly opened, the pressure or vaccum level in the line 23 downstream of the valve 13 decreases and the vacuum in level of the controller 17 may be at a higher vacuum or subatmospheric level. As a result, the relatively higher pressure in port 34a tends to drive water and sewage upwardly through the surge tank and into the vacuum line 19 and controller 17. The check valve unit 35 however, then closes and positively prevents such flow. Similarly, if the downstream sewage line 3 is installed on a down slope towards the valve unit 4, the accumulating sewage and water will gravity flow downward to the closed valve unit. This creates hydrostatic pressure condition at the vacuum connecting port 34a which tends to force sewage upwardly through the connection. Once again, the check valve 35 closes to prevent such movement.

Although the check valve unit 35 may be of any suitable construction, a double check valve unit such as a commercially available elastomer duckbill construction provides a highly reliable and effective seal, particularly in those installations encountering hydrostatic pressure tending to force sewage into the vacuum system. A duckbill valve generally is a molded rubber member having a flanged cylindrical mounting portion 36 with flat inclined walls 37 and 37a extending into mating sealing engagement. The valves are shown mounted in a connecting capped nipple 38 with a tubular spacer 39 therebetween.

The vacuum line 19 is connected to the spool valve unit 17 and through such unit to the controller 16 for controlling the actuation thereof, and thereby supplying vacuum and atmospheric air to the outer or working top chamber 40 of the operator 15 for opening and closing of the valve unit 4. The spool valve unit 17 as shown in FIG. 3 and more fully described in the cross-referenced patent is a diaphragm actuated device having the vacuum line 19 and atmospheric air connected to one side of a diaphragm 41. A spring-loaded spool 42 is coupled to the diaphragm and is slidably mounted between a pair of sliding lip seals 43, with vacuum line 19 connected to one end of the spool chamber and the air line 20 to the opposite end via the unit 32. The pressure conditions applied to the diaphragm 41 positions the spool 42 to selectively connect the vacuum end or the air end of the chamber to an outlet port 44 intermediate the length of the chamber and between the sealing lips 43. The port 44 is connected to the top or operating chamber 40 of the operator 15 to correspondingly supply vacuum pressure or atmospheric pressure thereto. The opposite chamber 45 of the cylinder 27 is connected to atmospheric air via the drain unit 32 to permit the free movement of the operator piston 30 and rolling diaphragm 31.

With both chambers 40 and 45 connected to the atmospheric air, the spring 31a is operative to force the cup-shaped piston 30 into the lower cylinder member 27, with the piston rod and interconnected elastomer seal provided plug 24 moving downwardly into sealing engagement with the valve seat 26. The atmospheric and hydrostatic pressure on the upstream side of the plug 24 and the vacuum pressure on the downstream side results in the differential pressure which further positively seals main valve 13. When a vacuum is impressed on chamber 40 by spool valve 17 and atmospheric air remains in chamber 45 the diaphragm 31 and cup-shaped piston 30 are, of course, forced outwardly into the cylinder member 28 to positively open valve 13 and permit the flow of sewage into the vacuum system.

The valve opening action is directly controlled by the sensor 18, which as previously noted is similar to that more fully described in previously issued U.S. Pat. Nos. 3,777,778 and 3,791,397. Generally, sensor 18 is a diaphragm unit having a diaphragm 47 operable to open and close an orifice 48. The orifice 48 connectes air signal line 20 to the controller 17 and supplies essentially continuous small flow of atmospheric air through the controller unit. The sensor 18 thus includes an input air line 49 and a connecting signal line 49a connected to the controller 16. At a selected hydrostatic pressure in the sewer line 3, the diaphragm unit closes the orifice 48 and constricts the air supply and generates an appropriate level signal to actuate the timing system of the controller 16. Once the timing system is triggered, it activates the discharge control means and particularly the spool valve 17 for a predeterminded period of time which is independent of any change in the pressure level to sensor 18, as more fully described in U.S. Pat. No. 3,777,778. The air supply to the sensor 18, controller 16 and operator 15, is of course derived from the water trap and drain unit 32 which is constructed to not only minimize introduction of water and moisture into the system but functions to remove any accumulated water from the system.

More particularly, the water trap and drain unit 32 includes a separating tank 50 suitably mounted to the one side of the operator 15 and, perferably extending downwardly below the lower end thereof. The tank 50 includes an inlet opening or port 51 in the side wall immediately above the bottom wall. The port 51 is connected to the air inlet line 20. The breather 22 provided on the inlet end of the line 20 removes solid matter from the incoming moist air prior to entering into the tank 50.

The connection to the controller 16 and to the spool element 17 are made at the upper end of tank 50 through suitable ports and suitable flexible connecting lines 53 and 54. An atmospheric air connecting line 55 is connected to the lower chamber 45 of the piston operator 15, intermediate the length of the tank 50. The tank 50 is generally an elongated cylinder defining a stagnation chamber. The moist air passes from the lower end upwardly through the tank 50. The tank 50 is filled with a suitable heat transfer material, such as a stainless steel mesh 56. The air thus enters at the lower end of the tank 50 and moves upwardly through the heat transfer medium 56 to the several exit ports for supplying of atmospheric air to the operator 15, the controller 16 and the spool valve 17. The tank 50 results in a substantial decrease in the air flow velocity and provides time for the air to cool such that the moisture is removed. The transfer medium 56 further increases the total length of the path of the moist air before moving into the several operating components. The increased length of the air path and particularly the large contact surface which may be provided by the addition of the heat transfer medium 56 effects a relatively high and complete heat transfer to the incoming hot moist air. As a result, the air temperature rapidly drops below the dew point of the air such that moisture in the air condenses out within the tank 50. The condensed moisture accumulates in the bottom of the tank 50, as at 57. The air introduced into the operator 15, the controller 16 and the spool valve unit 17 is thus air which may be saturated with moisture that is, at 100% relative humidity but it does not contain condensate or droplets of liquid moisture. The operating air contains water vapor, but such air is essentially at or below the temperature of the operating components. The air temperature will not therefore generally further decrease so as to condense moisture within the several operating components.

The controller 17 is preferably a fluid operated timer having an input side connected to the sensor and having a vacuum input as well as an air input. Air flows continuously through the sensor as well as various diaphragm actuated signal and timing devices 58 of the controller as shown in phantom in FIG. 3 and as more fully described in the U.S. Pat. No. 3,777,778.

Although individual filtered air supply connections are shown in the above patent, in practice a single air input line 53 would be used and connected to a controller filter 59, with suitable routing of the air to the several operatng elements.

The controller 16 is constructed with the various elements located to drain water and condensate therefrom. In particular, the several air flow restricting orifices which connect the vacuum line to other diaphragm components 58 and the like are placed at the lowest locations of the chamber to which they lead. Even though drops of water may flow through such orifices and therefore out of the chamber, with some interruption of normal controller functions, the water is always drained from the chamber. This in particular applies to an orifice unit 60 located within the spool valve unit 17 and connecting both sides of the diaphragm 41. This orifice enables operating of the spool valve by diaphragm components 58 of the timer and also the draining of moisture from the chamber of the spool valve. Thus, the opposite sides of diaphragm 41 are interconnected with the right side connected by a leakport type unit, not shown, to atmosphere, as more fully described in U.S. Pat. No. 3,777,778. An interconnecting restrictor or orifice can be built into the diaphragm, into the plastic housing or separately provided as shown in FIG. 3. Thus, unit 60 is shown having opposite connecting lines connected in the housing to the opposite sides of the diaphragm 41 at essentially the lowermost point. When a vacuum is created in line 19, any water is rapidly withdrawn. This is in contrast, for example, to a central location such as in the stem of the spool valve where the chambers could fill the stem, interfering with the proper functioning. The other diaphragm units of the controller proper may also be appropriately constructed and arranged, but it has not been found necessary to do so in a practical construction. The water does not therefore accumulate within any chamber such as to cause corrosion of the parts, permanently prevent the free movement of the diaphragms and other controller elements or permanently interfere with the free movement of the air through the controller.

The connecting line 53 from the controller input to the water trap 50 is preferably located on a down slope from the controller 16 to the water trap 50. Any moisture condensing within the line 53 automatically drains into and accumulates in the water trap 50 rather than into the controller 17. During the operating cycle, accumulated condensate and/or other leakage water within the valve system is removed and introduced into the sewer system.

In the illustrated embodiment of the invention, a drain line 62 is connected to a drain port 63 in the bottom of tank 50 and directly to the elbow or extension pipe 14 of the main valve 13. A check valve unit 64 shown including a pair of series connected duckbill valves 65 and 66 connects the line 62 to pipe 14. As shown most clearly in FIG. 4, an orifice member 68 is press-fitted or otherwise secured within the inlet valve 65 and the assembly is clamped within a suitable connecting nipple on the side of pipe 14 by a cap 67, similar to the mounting of unit 35.

When the main valve 13 opens and the sewage flows through the valve unit 13, a sub-atmospheric pressure condition is created within the pipe 14. The atmospheric pressure applied to the water in tank 50 forces the water upwardly through the drain line and the check valve unit 64, discharging the water into the sewage system.

The check valve unit 64 in the drain system is preferably constructed with the small orifice 68 for restricting air flow when the main valve is open. This minimizes air flow and pressure drop in the length of the air intake line or tube 20. With unrestricted flow an excessive pressure drop may occur in line 20, creating a self-triggering signal from the sensor 18. Thus, if the air input pressure decreases, the sensor output decreases and simulates the result of increasing hydrostatic pressure. A 0.035 inch orifice applied to a half inch diameter duckbill has provided a highly satisfactory flow control rate.

As noted previously, air introduced into the various operating components, namely, the controller 16, spool valve 17 and the operator 15 is essentially moisture free as a result of passing through tank 50. However, some further cooling and accompanying moisture condensation may naturally occur, particularly under high air flow rates such as occur during the opening and closing of the main valve 13. Further water leakage from the sewer line and/or from tank 50 may also occur. In the illustrated embodiment of the invention the system is arranged to accumulate such condensate and/or leakage water and to remove it.

For example, sewage water may leak past the sliding seal 29 into the lower cylinder 27 defining the air chamber 45. The chamber 45 is also connected to the moist air from tank 50 and some condensation may occur. The angled orientation of the cylinder results in all such condensate and water accumulating in the lowermost edge as at 71. A drain port 72 at the lower most water accumulation point is connected to the drain line 63 by a suitable connecting line 73 and tee connector 74. When the valve opens, water accumulated at 71 is also withdrawn from the lower chamber 45 as a result of the atmospheric air pressure in chamber 45.

Further, in the illustrated embodiment of the invention the upper chamber 40 is also constructed to be drained of any condensate or water which leaks into such chamber. The cup-shaped piston 30 provides an accumulating chamber within which any moisture condensed from the incoming air accumulates. Thus, each time the controller 16 is triggered operator air is rapidly drawn into chamber 40 at a high flow rate during the valve closing portion of the cycle. Although all the atmospheric air enters the upper chamber 40 through the moisture trap tank 50, under the high flow condition, the heat transfer efficiency is not sufficient to establish complete cooling of the air. As a result, some cooling and moisture condensation occurs within the upper chamber 40, with the condensate accumulating within the cup-shaped piston 30. A dip tube 75 is secured to upper end of the chamber and connected to the main air-vacuum line from the pilot valve unit 17. The dip tube 75 is preferably a flexible member which deflects as the cup piston 30 moves upwardly to the uppermost position. The lower end of the tube 75 deflects down into the lowermost edge of the piston within which the condensate and leakage has accumulated.

At the next opening cycle, a vacuum condition or pressure is created in the upper chamber 40 through the dip tube 75. The evacuation of the upper chamber 40 withdraws the water within the piston 30 with the piston positioning in the uppermost position. This position is of course held for the time out period of the controller 16 and allows ample time for such removal. The water thus is drained through the dip tube 75 and into the main vacuum sewage line via the line 19, check valve unit 37 and surge tank 34 each time the controller cycles.

As condensate water accumulates within the trap and drain tank 50, the supply air is drawn upwardly through an increasing height of water column. This creates a pressure drop upstream of the controller resulting in a pressure differential in the controller 16 and particularly the timing system similar to that created by an increasing hydrostatic pressure on sensor 18. This pressure differential may rise to a level generating a self-triggering cycle of the system to provide automatic draining of the moisture accumulated within the tank and other parts of the system. This self-triggered cycle is caused by the pressure differential between the atmospheric pressure and the air intake pressure transmitted to the controller 16 and the sensor 18.

The height of the water column inside the tank 50 needed for self-triggering of course depends on the setting of the sensor 18. If sensor setting, i.e. the pressure differential needed to operate its diaphragm is high, for example, close to a practical limit of 15 inches water gauge, a significant accumulation of condensate within the trap has to occur prior to self-triggering due to air intake pressure decrease. In fact, the condensate would have to rise to create a minimum 15 inch high water column to accomplish the self-triggering and if the total height of the water trap tank 50 is not sufficient, the water will rise to the level of the spool valve air intake and the controller air intake, resulting in a natural overflow into the valve 17 and controller 16. To avoid the overflow condition, the water trap preferably extends downwardly as far as practical, at least 15 inches vertically from connection of line 20 to connection of line 54 and/or 53, so as to create a self-triggering response prior to overflow. A similar condition may occur as a result of the flow control orifice 68 in the tank drain system. Thus, the check valve unit 65 may not permit sufficient rapid draining of the condensate 57 from within tank 50 an leakage water from within the lower end of the operator to completely drain tank 50. The condensate then progressively accumulates within the water tank 50. Eventually, the water height triggers a cycle or overflows into the spool valve unit 17 and from there into the chamber 40 of the piston operator 15.

During a subsequent opening cycle, such overflow water is drained by the dip tube 75 and again discharged into the main line.

During the closing stroke of the piston-operator, air in the lower chamber 45 is rapidly driven outwardly through the bottom drain connection line 73 and forced outwardly through the check valve unit 64 into the sewer line and also into the water trap tank 50. When driven back into the trap tank 50, any water remaining therein may be converted into a water mist. Such a water mist can be forced backwardly into the controller line 53 and then into controller air intake filter. As such filters are of a small micron type, the water mist may effectively close the openings, resulting in controller malfunction as a result of a failure to receive adequate air supply. In the illustrated embodiment of the invention, a suitable baffle plate 76 is located between the controller outlet port 53 to the controller 16 and the air connection to the tank 50 to prevent the entering of water mist into the controller port. The spool valve line 54 is connected to tank 50 immediately below the baffle plate 76. The small opening in the baffle plate 76 would tend to interfere with and restrict the large volume of air flow required to be supplied to the operator 15. The illustrated connection of course avoids such interference.

In summary, in the operation of the illustrated embodiment of the invention, the surge tank unit 33 with the top mounted check valve unit 37 essentially fully isolates the spool valve 17 and controller 16 from the foreign matter carried by the vacuum side of the sewer line while maintaining an accurate and reliable supply of vacuum pressure to the controller and spool valve. The moisture is essentially removed from the hot moist supply air and simultaneously discharged into the sewer system along with any other water or foreign sewage which leaks into the operating and/or control system. The system of the present invention by removal of any leakage water and condensate significantly minimizes the adverse characteristic associated with the prior art system.

Although shown in a preferred embodiment in the FIGS. 2-4, variations can of course be made. FIG. 5, for example, illustrates an alternate arrangement of the water trap and operator drain system. Corresponding elements in the two embodiments of the invention are correspondingly numbered for simplicity and clarity of explanation.

In FIG. 5, the bottom cylinder member 27 of the operator 15 is drained through a check valve unit 77 secured in the bottom or base wall 78 of the cylinder member 27 in alignment with the interior of valve pipe 14. The check valve unit 77 is positioned in the lower most portion of the base wall 78 within the extension pipe 14. The check valve unit 77 is shown as a single rubber duckbill element which prevents the upstream pipe sewage from entering into the lower chamber during the time main valve 13 is closed. When the main valve 13 opens, the vacuum of the sewer line again results in a decrease in pressure in the extension pipe 14, with a pressure differential across the valve causing the valve to open and condensate and leakage water accumulated within the chamber 45 drains into the main sewer line.

In this alternate embodiment, another means for draining of condensate from the tank is shown. In particular, the tank 50 is mounted in an upwardly spaced relation relative to the first embodiment. A water drain line or dip tube 79 is mounted in the tank and extends upwardly from the lower most end of the tank and exits at an intermediate portion from the tank. The outer end of tube 79 is connected to the upper end of the bottom wall 78 of cylinder 27. When the main valve 13 opens, the previously described differential pressure across the check valve 77 results in a lowering of the pressure in the chamber 45. The differential pressure again draws the water 57 by siphoning action of the dip-tube 79 from the lower end of the tank 50 into the chamber 45 and discharging it through the check valve 77 into the sewer line. An air flow restricting orifice 80 (approx. sized 0.035" dia) is again built into the check valve 77 for the same reasons as described for the orifice 68 built into the check valve 64.

Further, the complete filling of tank 50 with stainless steel mesh is relatively costly. The mesh may be located only above baffle plate 76, as shown in FIG. 5, but will of course be somewhat less effective in removing moisture from the controller removing moisture from the air.

Although the embodiments of FIGS. 1–4 would appear to provide somewhat more efficient withdrawal of the moisture, the embodiment of FIG. 5 does provide a relatively inexpensive and operable alternative system. As previously noted, the high rate of air flow associated with the valve opening and closing operations may generate an erroneous trigger signal to the controller. Such pressure drop can be minimized by using a short length and a maximum diameter of the air intake tubing 20. An alternate connection to minimize this effect may also include a separate air intake line 81, shown in phantom in FIG. 5, connected between the air intake line 54 to the spool valve 17 and the breather cap 22, in place of the connection 82 to moisture trap tank 50. A separate filter 83 might be employed in the line to remove dust and the like. In fact, a fine filter which does not introduce a self-triggering pressure drop could be employed in the main line 20. Generally, filters sufficient to properly clean the air have been found to produce an unacceptable pressure drop when connected in the line to the trap and controller.

Although the moist air introduced through the spool valve in the modified embodiment of FIG. 5, deposits condensate in the valve unit and/or the upper chamber of the operator, the self-draining construction as previously described removes such condensate and prevents an accumulation which can cause significant corrosion or permanently free movement of the operating components.

These and other rearrangements can be made within the teaching of the present invention to minimize and essentially prevent introduction of significant water into the system and to insure removal of any accumulated water and moisture from the system, thereby significantly contributing to the operating characteristic and life of the system.

Various modes of carrying out the invention are contemplated as being within the scope of the following claims, particularly pointing out and distincly claiming the subject matter which is regarded as the invention.

We claim:

1. In a sewage flow system employing a vacuum source means connected to the downstream end of a sewer line buried in the ground whereby sewage flows through the line as a result of vacuum pressure; a sewer line valve means for opening and closing said sewer line and having a sewage inlet side and a sewage discharge side; said valve means having a fluid valve operator means; a fluid controller for said valve operator means having a vacuum supply connection to the sewer line; said operator means, said controller and said valve means being buried in the ground; air supply means for supplying air to said operator means, said controller and said valve means and including a moisture trap means having an outlet and condensing of moisture in the incoming air; said trap being coupled to said sewer flow line and subjected to said vacuum pressure of said sewer line in response to operation of said sewer line valve means for discharging of the condensate to said sewer line, wherein said controller is located above the valve means and the trap, and an air line connected to the trap for supplying air to said controller is located and arranged to drain moisture in the line into the trap.

2. In a sewage flow system employing a vacuum source means connected to the downstream end of a sewer line buried in the ground whereby sewage flows through the line as a result of vacuum pressure; a sewer line valve means for opening and closing said sewer line and having a sewage inlet side and a sewage discharge side; said valve means having a fluid valve operator means; a fluid controller for said valve operator means having a vacuum supply connection to the sewer line; said operator means, said controller and said valve means being buried in the ground; air supply means for supplying air to said operator means, said controller and said valve means and including a moisture trap means having an outlet and condensing of moisture in the incoming air; said trap means includes a tank having an inlet at the lower end connected to said air supply means, a bottom drain outlet coupled to said sewer line and subjected to said vacuum pressure of said sewer line in response to operation of said sewer line valve means for discharging of the condensate to said sewer line and an upper controller outlet connected to said controller outlet, a heat exchange material in said tank, a drain line connected to the drain outlet, and a check valve means connecting the drain line to the sewage inlet side of the valve means.

3. The sewage flow system of claim 2 including an orifice means in the input side of the check valve means.

4. The sewage flow system of claim 2 wherein said operator includes a piston-cylinder power means including a top chamber an a bottom chamber, and having a drain line connected to the bottom chamber of the operator cylinder and said check valve means for draining of water therefrom.

5. The sewage flow systemm of claim 4 including a supply air connection at the center portion of the tank and to the bottom side of the operator cylinder.

6. The sewage flow system of claim 2 including a pilot spool valve means between the tank and the operator, first and second air supply connecting tubes from the trap tank to the controller and to the spool valve means, said controller being located above said spool valve means and above said tank to drain moisture in the connecting tubes into said trap tank and to minimize overflow of water from the tank into the controller.

7. The system of claim 6 wherein a baffle plate is located in the tank beneath the controller tank connection, said spool valve means connection is located below the baffle plate.

8. The sewage flow system of claim 7 including a surge tank means connected to said sewage line and to said controller for supplying of a vacuum signal to said controller from said sewage line and including a valve means to prevent entrance of foreign matter into the controller.

9. The sewage flow system of claim 2 wherein said operator includes a piston-cylinder power means including a top chamber and a bottom chamber, and a drain means connected to the bottom chamber and to the sewer line and including a check valve means to discharge to the sewer line and to prevent flow from the sewer line.

10. The system of claim 8 wherein the check valve means include an orifice means.

11. In a sewage flow system employing a vacuum source means connected to the downstream end of a sewer line buried in the ground whereby sewage flows through the line as a result of vacuum pressure; a sewer line valve means for opening and closing said sewer line and having a sewage inlet side and a sewage discharge side; said valve means having a fluid valve operator means; a fluid controller for said valve operator means having a vacuum supply connection to the sewer line; said operator means, said controller and said valve means being buried in the ground; air supply means for supplying air to said operator means, said controller and said valve means and including a moisture trap means having an outlet and condensing of moisture in the incoming air; said trap being coupled to said sewer flow line and subjected to said vacuum pressure of said sewer line in response to operation of said sewer line valve means for discharging of the condensate to said sewer line, said valve operator means includes a double acting piston-cylinder operator having an upwardly opening cup-shaped piston means forming a water accumulating chamber, and a dip tube means extending into said piston means to remove condensate and moisture therefrom, said moisture trap means having a bottom outlet for removing of moisture therefrom, means connecting the dip tube means, said bottom outlet and said bottom of the operator means to the sewer line for introducing of accumulated moisture into the sewer line.

12. In the sewage flow system of claim 11 wherein said trap means includes a tank having an inlet at the lower end, a bottom drain outlet and an upper controller outlet, a heat exchange material in said tank, a drain line connected to the drain outlet, a check valve means connecting the drain line to the upstream side of the valve means, and an orifice means in the input side of the check valve means.

13. The sewage flow system of claim 12 including a pilot spool valve means between the tank and the top of the operator and including first and second air supply connecting tubes from the trap tank to the controller and to the spool valve means, said controller being located above said tank to drain moisture in the connecting tubes into said trap tank, said dip tube means being connected to the spool valve means.

14. The sewage flow system of claim 13 including a surge tank connected to said sewer line immediately upstream of the main valve and to said controller for supplying of the vacuum to said controller from said sewer line and including a check valve means to prevent entrance of foreign matter into the controller.

15. In a sewage flow system employing a vacuum source means connected to the downstream end of a sewage flow line buried in the ground whereby sewage flows through the line as a result of vacuum pressure; a sewer line valve means for opening and closing said sewage line; said valve means having a fluid valve operator means; a fluid controller means for said valve operator means; said operator means, said controller means and said valve means being buried in the ground; an air supply line for supplying air to said operator means, said controller and said valve means; said operator means, controller and valve means being constructed and arranged to accumulate water in the system in water accumulating chambers; said chambers being coupled to said sewer line for discharging of the water to said sewer line and means responsive to opening of the valve means to discharge the accumulated water.

16. In a vacuum operated sewage system having a vacuum source connected to a downstream end of a collection line and having a valve unit connected to an upstream end of the collection line and having a fluid actuated controller and operator unit connected to the vacuum side of the collection line and to atmospheric air, said controller and operator unit being located in a subterranean pit having a vertical air line extending upwardly to the exterior of the pit, said controller and operator unit being constructed and arranged to accumulate water in selected low portions thereof, trap means within the pit connected to the lower end of said air line and operable to cool air and condense moisture from the air prior to supplying air to the controller and operator unit, and means responsive to the opening of the valve unit to remove said condensate from the controller and operator unit and said trap means.

17. The sewage flow system of claim 16 wherein said operator unit includes a piston-cylinder power means including a top chamber and bottom chamber, a valved drain means connected to said bottom chamber and to the sewer line to discharge accumulated water to the sewer line and to prevent flow from the sewer line into the chamber.

18. The sewage flow system of 17 wherein said valve operator unit includes an upwardly opening cup-shaped piston forming a water accumulating chamber, and a dip tube means selectively connected to the vacuum supply and to the air supply and extending into said piston to supply vacuum and air pressure and to remvoe condensate and moisture therefrom.

19. In the sewage flow control system of claim 18 having a pilot spool valve connected to the vacuum supply and to the air line and a diaphragm operator connected to said controller, and wherein said controller and spool valve are located above the valve unit and the trap means, said trap means including a elongated tank having a lower air inlet and a pair of top outlets to the controller and the spool valve and an intermediate connection to the bottom chamber of the operator, a heat exchange material between the air supply inlet and the air outlets, air lines connecting the spool valve and controller to said outlets for supplying air to said controller and spool valve and located to arrange to drain moisture in the lines into the trap, and means responsive to the opening of the valve means to discharge the condensate into the sewage line.

20. The flow system of claim 19 including a surge tank attached to said sewer line and having a connecting line to said spool valve for supplying of a vacuum signal thereto, means connecting the vacuum of the spool valve to said controller, and a check valve means at said surge tank to prevent the entrance of foreign matter into the controller.

21. In a sewage flow control system employing a vacuum source connected to the downstream end of a sewage flow line whereby sewage flows through the line as a result of the vacuum pressure, a sewer line valve having a flow pipe connected in said sewage line with a valve closure member movably mounted therein and having an upwardly inclined extension pipe with an end wall, a piston-cylinder operator secured to the outer end of the extension pipe and having a piston rod slidably mounted in a sliding seal in said end wall and connected to said closure member to open and close the valve, a controller mounted on said cylinder operator and having an air operated timing means and a pilot valve for supplying of air and vacuum to said operator, an air supply line for supplying air from above ground to said controller, a condensate tank mounted adjacent the valve and having a bottom inlet connected to the air line and first and second top outlets, the top of said tank being located below the level of the controller and pilot valve, a heat exchange material in said tank between said inlet and said outlets, said tank having a bottom discharge coupled to said sewage flow line for discharging of condensate to said sewage line in response to opening of the sewer line valve and extending upwardly therefrom, a surge tank having a lower opening connected to the discharge side of said line valve, a check valve connected to the top of the surge tank and a vacuum line from the check valve to said controller for supplying of a vacuum to said controller from said sewage line; said pilot valve including a vacuum chamber and an air chamber and a valve member selectively positioned to connect an outlet port to said chambers, said operator includes an upwardly opening cup-shaped piston, and a flexible dip tube extending into the lower end of said piston and being deflected downwardly to the lower end to remove moisture therefrom, and means connecting said dip tube to the pilot valve output for removing moisture therefrom through the vacuum chamber of the pilot valve.

22. In a sewage flow system employing a vacuum source means connected to the downstream end of a sewer line buried in the ground whereby sewage flows through the line as a result of vacuum pressure; a sewer line valve means for opening and closing said sewer line and having a sewage inlet side and a sewage discharge side; said valve means having a fluid valve operator means; a fluid controller for said valve operator means having a vacuum supply connection to the sewer line; said operator means; said controller and said valve means being buried in the ground; air supply means for supplying air to said operator means, said controller and said valve means and including a moisture trap means having an outlet and condensing of moisture in the incoming air; said trap being coupled to said sewer flow line and subjected to said vacuum pressure of said sewer line in response to operation of said sewer line valve means for discharging of the condensate to said sewer line, said trap means is an elongated tank member having a lower inlet and a top outlet to the controller and a bottom drain outlet, said controller being connected to the downstream side of the sewer line valve means to establish a continuous air flow through the trap and the controller with the sewer line valve means closed, said controller being responsive to the pressure generated within the trap in response to water accumulating over the inlet and effectively closing said inlet to trigger the controller to open the sewer line valve means and thereby discharging of the condensate to said sewer line as well as removing of any sewage accumulated in the line.

23. The sewage flow control system of claim 22 wherein said tank member extends downwardly substantially below the connection to the controller to control the level of condensate accumulation within the tank member required to effect self-triggering due to the closure of the air inlet.

24. In a vacuum operated sewage system having a vacuum source connected to a downstream end of a collection line and having a valve unit connected to an upstream end of the collection line and having a fluid actuated controller and operator unit connected to the vacuum side of the collection line and to atmospheric air, said controller and operator unit being located in a subterranean pit and having an air line extending to a source of atmospheric air, said controller and operator unit being constructed and arranged to accumulate water in selected low portions thereof, trap means within the pit connected to said air line and operable to cool air and condense moisture from the air prior to supplying air to the controller and operator unit, and means responsive to the opening of the valve unit to remove said condensate from the controller and operator unit and said trap means.

* * * * *

UNITED STATES PATENT AND TRADEMARK OFFICE
CERTIFICATE OF CORRECTION

PATENT NO. : 4,171,853
DATED : October 23, 1979
INVENTOR(S) : DONALD DEAN CLEAVER ET AL It is certified that error appears in the above-identified patent and that said Letters Patent are hereby corrected as shown below:

| | | |
|---|---|---|
| Column 1, | Line 59 | After "the" cancel "light" and substitute therefore --- liquid ---; |
| Column 6, | Line 35 | After "the" cancel "controlleer" and substitute therefore --- controller ---; |
| Column 8, | Line 61 | After "and," cancel "perferably" and substitute therefore --- preferably ---; |
| Column 14, | Line 14 | After "and" cancel "distincly" and substitute therefore --- distinctly ---; |
| Column 16, CLAIM 18 | Line 63 | After "and to" cancel "remvoe" and substitute therefore --- remove ---; |
| Column 18, CLAIM 22 | Line 12 | After "means" cancel ";" and substitute therefore --- , ---. |

Signed and Sealed this

Twenty-fifth Day of March 1980

[SEAL]

Attest:

SIDNEY A. DIAMOND

Attesting Officer

Commissioner of Patents and Trademarks